(12) United States Patent
Nutt et al.

(10) Patent No.: US 10,137,662 B2
(45) Date of Patent: Nov. 27, 2018

(54) FLEXIBLE LIGHTWEIGHT ARC FLASH AND FLASH FIRE RESISTANT POLYVINYLCHLORIDE FABRIC AND GARMENTS AND METHODS THEREFOR

(71) Applicant: Tingley Rubber Corporation, Piscataway, NJ (US)

(72) Inventors: Brian C. Nutt, Mendham, NJ (US); James P. Towey, Nutley, NJ (US); Dave Narasimhan, Flemington, NJ (US); Michael S. Zedalis, Mendham, NJ (US)

(73) Assignee: Tingley Rubber Corporation, Piscataway, NJ (US)

( * ) Notice: Subject to any disclaimer, the term of this patent is extended or adjusted under 35 U.S.C. 154(b) by 870 days.

(21) Appl. No.: 14/451,572

(22) Filed: Aug. 5, 2014

(65) Prior Publication Data

US 2016/0039170 A1    Feb. 11, 2016

(51) Int. Cl.
  *B32B 5/02* (2006.01)
  *B32B 27/22* (2006.01)
  (Continued)

(52) U.S. Cl.
  CPC .......... *B32B 5/022* (2013.01); *A41D 31/0027* (2013.01); *B32B 7/14* (2013.01);
  (Continued)

(58) Field of Classification Search
  USPC ........... 428/196, 198, 317.1, 424.6; 442/394, 442/396; 156/108, 306.6, 333; 2/424,
  (Continued)

(56) References Cited

U.S. PATENT DOCUMENTS 2,517,356 A    8/1950  Piere
2,646,414 A    7/1953  Gillespie
(Continued)

OTHER PUBLICATIONS

Saurabh Das, Solvents: Properties, solubility parameter, salvation, toxicity, safety, (internet article), ca. 2010.
(Continued)

*Primary Examiner* — Lynda Salvatore
(74) *Attorney, Agent, or Firm* — Servilla Whitney LLC

(57) ABSTRACT

A light weight flexible flame, arc flash and flash fire resistant fabric for protective garments is made from a flexible polyvinylchloride sheet having phthalate or phthalate free plasticizers coated with well defined parallel lines or grids of adhesive layer. The adhesive coated polyvinylchloride sheet contacts a non-woven meta-aramid fiber liner and is heated to produce a bond between the polyvinylchloride sheet and the liner. Both polyvinylchloride sheet and meta-aramid non-woven liner resist heat. When heat from arc flash or flash fire is applied, the heat is conducted away at local contacting regions of the adhesive with the polyvinylchloride sheet to the liner whereby the temperature of the polyvinylchloride is locally reduced preventing sagging, charring or burning of the space between adhesive contacting regions. This structure produces mechanically strong lightweight arc flash and flash fire resistant fabric suited for producing garments that meet all ASTM specifications for fireproof garments.

21 Claims, 12 Drawing Sheets

(51) Int. Cl.
*B32B 27/30* (2006.01)
*B32B 7/14* (2006.01)
*B32B 27/12* (2006.01)
*A41D 31/00* (2006.01)

(52) U.S. Cl.
CPC .............. *B32B 27/12* (2013.01); *B32B 27/22* (2013.01); *B32B 27/304* (2013.01); *B32B 2262/0269* (2013.01); *B32B 2307/306* (2013.01); *B32B 2307/3065* (2013.01); *B32B 2307/546* (2013.01); *B32B 2307/7265* (2013.01); *B32B 2437/00* (2013.01)

(58) Field of Classification Search
USPC .......................................................... 2/275
See application file for complete search history.

(56) References Cited

U.S. PATENT DOCUMENTS

| | | | |
|---|---|---|---|
| 2,427,513 | A | 10/1958 | Spessard |
| 4,139,613 | A | 2/1979 | Hefele |
| 4,970,111 | A | 11/1990 | Smith, Jr. |
| 6,364,980 | B1* | 4/2002 | Smith .................. A62B 17/006 156/108 |
| 7,921,471 | B2 | 4/2011 | Mordecai et al. |
| 8,156,576 | B1 | 4/2012 | Terrell |
| 8,359,675 | B2 | 6/2013 | Terrell |
| 2008/0176065 | A1 | 7/2008 | Hirschmann et al. |
| 2010/0251466 | A1* | 10/2010 | Langley ................... B32B 5/18 2/458 |
| 2011/0262704 | A1 | 10/2011 | Rock |

OTHER PUBLICATIONS

FIG. 10 of patent application is a photomicrograph of sample 2, a polyvinylchloride sheet adhesively bonded to non-woven meta-aramid liner showing the appearance of the liner, photomicrograph taken by Dave Narasimhan, believed to be available prior to the filed of the present application. See specification of patent application paragraphs 41 and 69.

FIG. 11 of patent application is a photomicrograph of sample 2, a polyvinylchloride sheet adhesively bonded to non-woven meta-aramid liner with the liner removed on one side showing the appearance of the adhesive, photomicrograph taken by Dave Narasimhan, believed to be available prior to the filed of the present application. See specification of patent application paragraphs 42 and 72.

Vallabh, Rahul. "Thermal Barrier Properties of Flame Resistant Nonwovens", Thesis NC State 2005, 105 pgs.

* cited by examiner

FIG. 4

Table 2. Conduction Component of Effective Thermal Conductivity at Different Values of Z

| Sample | Density, kg/m³ | $k_c$ at Z=0.67, W/mK | $k_c$ at Z=0.90, W/mK | $k_c$ at Z=0.95, W/mK | $k_r$ at Z=0.67, W/mK |
|---|---|---|---|---|---|
| $N_{a3}$ | 36.41 | 0.02422 | 0.02421 | 0.02421 | 0.05900 |
| | 38.23 | 0.02423 | 0.02422 | 0.02422 | 0.05560 |
| | 37.64 | 0.02423 | 0.02422 | 0.02421 | 0.05691 |
| $N_{a2}$ | 27.60 | 0.02417 | 0.02416 | 0.02416 | 0.05910 |
| | 28.50 | 0.02417 | 0.02416 | 0.02416 | 0.05919 |
| | 32.01 | 0.02419 | 0.02418 | 0.02418 | 0.06203 |
| $N_{b3}$ | 33.78 | 0.02421 | 0.02420 | 0.02420 | 0.06119 |
| | 33.78 | 0.02420 | 0.02419 | 0.02419 | 0.06307 |
| | 39.34 | 0.02424 | 0.02423 | 0.02422 | 0.05954 |
| $N_{b2}$ | 26.62 | 0.02416 | 0.02415 | 0.02415 | 0.06512 |
| | 25.63 | 0.02415 | 0.02415 | 0.02415 | 0.06616 |
| | 24.26 | 0.02415 | 0.02414 | 0.02414 | 0.06799 |
| $N_{c3}$ | 28.41 | 0.02417 | 0.02416 | 0.02416 | 0.06498 |
| | 28.41 | 0.02417 | 0.02416 | 0.02416 | 0.06646 |
| | 26.66 | 0.02416 | 0.02415 | 0.02415 | 0.06633 |
| $N_{c2}$ | 26.80 | 0.02416 | 0.02415 | 0.02415 | 0.06336 |
| | 26.44 | 0.02416 | 0.02415 | 0.02415 | 0.06354 |
| | 25.28 | 0.02415 | 0.02415 | 0.02414 | 0.06393 |

Radiation and Conduction Component of Effective Thermal Conductivity for samples $N_{a2}$, $N_{a3}$, $N_{b2}$, $N_{c2}$, and $N_{c3}$.

FIG. 6
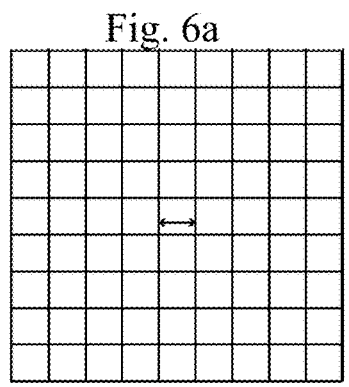
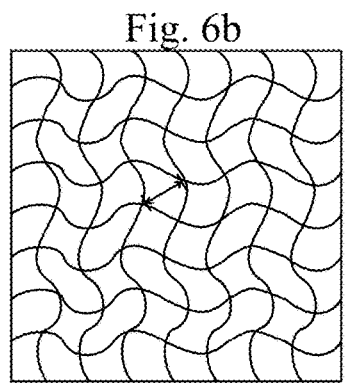
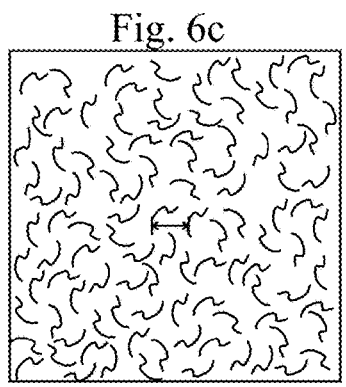
Fig. 6a  Fig. 6b  Fig. 6c
⊢—⊣ 0.25- 1.5 mm

FIG. 7

| Performance Characteristic | ASTM Reference | Remarks | SAMPLE 1 | SAMPLE 2 |
|---|---|---|---|---|
| Total Weight (oz/yd) | ASTM D-751, section 10; D-3776 | - | 10.12 | 10.53 |
| Thickness (in.) | ASTM D-751, section 9; D-1777 | - | 0.023 | 0.019 |
| Coating Adhesion (lbs-f/2in) | ASTM D-751, section 45 (12 in./min.) | MD | 8.5 | 12.15 |
| | | XD | 6.7 | 8.5 |
| Tensile (grab strength) lbs-f | ASTM D-751, Procedure A; D-5034 (1x1 inch jaw face) | MD | 58.5 | 55 |
| | | XD | 45.2 | 63 |
| (Breaking Strength 2" cut strip method) | ASTM D-751-06, Procedure B;D-5035 | MD | 62 | 52.5 |
| | | XD | 46 | 39 |
| (Elongation at Break %) | ASTM D-751, section 17; D-5034 (1x1 in jaw face) | MD | 41.8 | 38 |
| | | XD | 85.5 | 236.75 |
| Tongue Tear Strength (lbs-f) | ASTM D-751, Procedure B (12 in./min.) | MD | 6.7 | 5.85 |
| | | XD | 4.5 | 4.4 |
| Hydrostatic Resistance high pressure fabric penetration (PS) | ASTM D-751, Procedure A, 1 | - | 63 | 51.5 |
| Flame Resistance | ASTM D-6413 | after flame | 0.5 | 0 |
| | | char length | 0.5 | 1.8 |
| High Visibility Chromacity coordinates, luminance | Complete ANSI 107 | - | Pass | Pass |
| Arc Thermal Performance ATPV (cal/cm2); HAF (%); Ebt (cal/cm2) | ASTM F-1891; Method ASTM F-1959 | - | ATPV = 11; Ebt = 42; HAF = 81% | ATPV=10.9 Ebt=36.4 HAF= 79.2% |
| Flash Fire | ASTM F-2733 Method ASTM F1930 | | Pass | Fail |

700

Hansen graph of solubility areas for polyvinyl acetate (PVA), poly vinyl butyral (PVB) and poly vinyl chloride (PVC). This type of graph uses only two of the three Hansen parameters

FLEXIBLE LIGHTWEIGHT ARC FLASH AND FLASH FIRE RESISTANT POLYVINYLCHLORIDE FABRIC AND GARMENTS AND METHODS THEREFOR

FIELD OF THE INVENTION

The present invention relates to a method and structure for producing a flexible fabric containing a polyvinylchloride sheet adhesively bonded to a meta-aramid (Nomex) nonwoven sheet for producing highly visible protective waterproof garments providing both flexibility and arc flash and flash fire resistance.

BACKGROUND

Arc flash and flash fire resistant fabrics, and garments made therefrom, need to meet several ASTM specifications and should be tested according to ASTM test methods provided. The ASTM specifications related to arc flash and flash fire resistant fabrics and garments include ASTM D751: "Standard Test Methods for Coated Fabric"; ASTM F1959: "Standard Test Method for Determining the Arc Rating of Materials for Clothing"; ASTM F2733: "Standard Specification for Flame Resistant Rainwear for Protection Against Flame Hazards"; ASTM D6413/D6413M: "Standard Test Method for Flame Resistance of Textiles (Vertical Test)"; ASTM F1891: "Standard Specification for Arc and Flame Resistant Rainwear"; and ASTM F1930: "Standard Test Method for Evaluation of Flame Resistant Clothing for Protection Against Flash Fire Simulations Using an Instrumented Manikin".

Numerous prior art patents and disclosures relate to creating a fabric with attached polyvinylchloride sheets. The relevant patents and publications are discussed below.

U.S. Pat. No. 4,139,613 to Hefele discloses a process for the patterned deposition of powdered thermoplastic adhesive materials on the outer surface of a surface form. This process is for the patterned deposition of powdered thermoplastic adhesive materials on the outer surface of a textile or other porous-flexible surface form, wherein there is first insertion raked in a pattern of depressions formed in an engraved component an adhesive powder material and then on this powder a further adhesive powder material is insertion raked in the depressions, so that both the powder layers superposed one on the other are taken up by the surface form which is positioned on the engraved component. The surface form of a polyvinylchloride sheet does not have a porous surface. Further, the adhesive powder is not indicated to be polyvinylchloride.

U.S. Pat. No. 4,970,111 to Smith, Jr. discloses flame retarding fusion bonded non-woven fabrics. This fire resistant, non-dripping, fusion bonded, non-woven fabric or fabric structure comprising a synergistic blend of about 35 to 80% by weight of chlorine-containing polymeric fibers, about 2 to 25% by weight of stabilized polyacrylonitrile fibers and about 10 to 55% by weight of a fire retarding polyester binder. The non-woven fabric of chlorine containing fibers is made from fibers of polyvinylidene dichloride, chlorinated polyethylene, and polyvinyl chloride. The chlorine containing non-woven fabric is not a meta-aramid liner and is not attached to a PVC sheet.

U.S. Pat. No. 7,921,471 to Mordecai, et al. discloses a protective coat for use by emergency responders. This coat is for use by emergency responders, such as firefighters. Certain aspects of the coat include a barrier resistant liner for protection against chemical and biological agents, a compression zone that can improve safety when working in hazardous areas, and a flame resistant shell including zippered sleeves that can facilitate the donning of protective gloves. The barrier liner is made from material selected from the group consisting of urethanes, PTFE, neoprene, natural and synthetic rubber, para-aramids, and polyamides. There is no non-woven liner attached to the barrier liner.

U.S. Pat. Nos. 8,156,576 and 8,359,675 to Terrell disclose flash fire and chemical resistant fabric and garments. The flash fire and chemical barrier composite fabric comprises a flame resistant fibrous basic layer, a radiant heat and chemical permeation barrier. The barrier includes a metalized polymeric chemical permeation resistant layer film. A clear heat sealable outer film layer overlays over the radiant barrier and forms a heat sealable outer surface of the composite fabric. The flame resistant fibers are chosen from fiberglass, carbonized fibers, rayon, cotton, wool and aramid fibers, aromatic polyamide, polyester, or their blends. The radiant heat and chemical permeation barrier layer is chosen from polyvinylidene chloride, ethylene vinyl acetate, chlorinated polyethylene, polyethylene, low density polyethylene, linear low density polyethylene, high density polyethylene, nylon, polyvinyl alcohol, polyester, polytetrafluoroethylene, fluorinated ethylene propylene, propylene, polyvinyl chloride copolymer, acrylic, acrylonitrile, and ethylene vinyl alcohol. The radiant heat and chemical permeation barrier layer is a co-extruded multi-layer film with a metalized layer adhered to its top and/or bottom. The flash fire resistance is improved by the metalized film coated radiant heat and chemical permeation barrier layer. A thermal expanding adhesive layer dispersed between the flame retardant fiber and a metalized chemical barrier layer. This thermal expanding adhesive layer prevents ignition of the outer clear thermoplastic layer when exposed to flash fire. The fabric has five functional layers, as shown in the figures and the Description of Embodiments of the Invention, which are bonded together using the adhesive to form the fabric and the flexibility of the fabric is expected to be poor.

U.S. Patent Application No. 20110262704 to Rock et al. discloses flame resistant composite fabrics. The flame resistant composite fabric includes a first flame resistant fabric layer, a second flame resistant fabric layer, and a barrier layer that bonds the first flame resistant fabric layer to the second flame resistant fabric layer. The barrier layer is capable of withstanding temperature of 500° F. for at least 5 minutes without substantial changes in the integrity of the flame resistant composite fabric. Both the first flame resistant fabric layer and the second flame resistant fabric layer are formed of flame resistant treated fibers, yarns, and/or fabric. As shown in FIG. 3, the adhesive 24 is indicated to be polyvinylchloride bonding first and second flame resistant fabric layers 21, 22. The flame resistant fabric does not contain a sheet of polyvinylchloride.

U.S. Patent Application No. 20080176065 to Hirschmann et al. discloses a flash resistant material. This arc flash resistant material includes a para-aramid non-woven material substrate and a polyurethane film containing approximately 10-40% by weight of antimony oxide ($Sb_2O_3$, $Sb_2O_5$) and decabromodiphenyl oxide containing a high level of aromatic bromine laminated to a first surface and a second surface of the para-aramid non-woven material substrate. The arc flash resistant material may be breathable and include antistatic properties. The arc flash resistant material is lightweight, exhibits an exceptionally high level of protection from an arc flash hazard, and possesses a low particulate level that is required for clean room applications.

As shown in FIG. 1, the non-woven fabric substrate is surrounded on both sides by flame resistant polyurethane film. The non-woven substrate contains para-aramid fibers not flame resistant meta-aramid (Nomex) fibers. A polyvinylchloride sheet is not attached to the non-woven substrate.

Publications and patents related to the properties of polyvinylchloride are also included below.

The web page at http://engineering.ucsb.edu/~saurabh/Presentations/Solvents.pdf details a thesis in which solvent properties are linked with corresponding polymers. As shown in FIG. 7, polyvinylchloride is soluble in methylene chloride, ethylene dichloride, and tetrahydrofuron. Since acetone is on the boundary of the circle in the Hansen graph of solubility, the solubility of PVC in acetone is expected to be minimal. The following patent disclosures detail the effect of molecular weight of polyvinylchloride in acetone indicating that high molecular weight (>18,000) do not dissolve in acetone while low molecular weight polyvinylchloride (4000-16,000) dissolves.

U.S. Pat. No. 2,427,513 to Spessard discloses a process of dispersing copolymer of vinyl chloride and vinyl acetate in a ketone and hydrocarbon dispersant. Some of such resins are virtually insoluble in the common organic solvents at ordinary temperatures, while sufficient amounts of others to be practical cannot be dissolved in the solvents without the solutions becoming unduly viscous or gelling. When articles are coated with dilute solutions, multiple coats must be applied to secure the requisite coating thickness, and large volumes of solvents are necessarily handled. Resins of the first class include delta polyvinyl chloride, while the second class of resins includes beta polyvinyl chloride, copolymers of vinyl chloride with vinyl acetate, which have molecular weights above 16,000, as determined by Staudinger's method, and vinyl chloride contents within the range of 90 to 99%, as well as copolymers of vinyl chloride with maleate esters and acrylate esters, such as dibutylmaleate, ethyl acrylate, methyl acrylate, and methyl methacrylate of substantially the same combined vinyl chloride content and molecular weight. Resins, such as the copolymers of vinyl chloride with acrylonitrile, containing from 45 to 80% vinyl chloride, which are soluble in acetone but insoluble in many other solvents, and the copolymers of vinyl chloride with vinylidine chloride have solubility characteristics intermediate to these classes, depending on their molecular weight. All of such resins may be characterized by being at least swellable by acetone, but acetone has no greater solvent action on them than it does on a copolymer of vinyl chloride with vinyl acetate having a molecular weight of 16,000 and a vinyl chloride content of 90%. A 20% solution of this resin in a mixture of 50 parts of acetone and 50 parts or toluene by volume has a viscosity of 31 seconds at 25° C.

U.S. Pat. No. 2,517,356 to Pierre discloses solutions of polyvinyl chloride in a mixture of acetone and perchloroethylene. It has been known that the solubility of vinylchloride polymers in organic solvents varies considerably according to the degree of their polymerization, Thus, polymers of low molecular weight are completely soluble in acetone, while polymers of high molecular weight do not dissolve in acetone even at boiling temperature and they do not dissolve in most of the other organic solvents either. This lack of solubility limits to a great extent the uses of vinylchloride polymers of high molecular weight, which, as known, are the most interesting technically. Example 1 of the patent application indicates that a vinyl chloride polymer having a molecular weight of 18,000 is insoluble in acetone at ordinary room temperature. The molecular weight is calculated by using Staudingers formula $Nsp/c=Km \times M$, where Nsp is the specific viscosity measured at 20 C of a solution of 2 g./liter of the polymer in a solvent consisting of equal volumes of acetone and carbon disulfide. Km is a constant of the solvent amounting to $2.7 \times 10^{-4}$; c is the concentration in grams per liter and M the degree of polymerization.

U.S. Pat. No. 2,646,414 to Gillespie discloses a polyvinyl chloride polymer dispersion. A low-molecular-weight vinyl chloride polymer (or mixture of polymers) shows an appreciable solubility in ketones by weight, and which is a vinyl chloride polymer (inclusive of copolymers) of a molecular weight between 5,000 and 16,000 and having in excess of about 60% by weight combined vinyl chloride in the molecule. Acetone is the preferred volatile organic liquid since acetone produces compositions of a higher solids content for a given viscosity.

Based on the foregoing, there exists a need in the art for a flexible arc flash and flash fire resistant polyvinylchloride fabric and garments using the fabric that have a non-woven meta-aramid (Nomex) fiber liner bonded to a polyvinylchloride sheet. The arc flash and flash fire resistant properties of polyvinylchloride sheet bonded to fire resistant non-woven substrate of meta-aramid fibers allows the creation of a lightweight flexible single layer garment.

SUMMARY OF THE INVENTION

In accordance with one aspect of the present invention, flexible and heat resistant garments, including coats, vests, pants, and overalls are provided. The garments include a plurality of sections made with a fabric. The fabric comprises: a flexible polyvinylchloride sheet comprising plasticizers; a non-woven liner of meta-aramid fiber; and an adhesive covering a part of the flexible polyvinylchloride sheet that forms a bond only between a part of the flexible polyvinylchloride sheet and a part of the non-woven liner of meta-aramid fiber, the adhesive being discontinuous lines and forming discrete locations that are spaced in the range of 0.25 to 1.5 mm.

In accordance with another aspect of the invention, the adhesive contacts the part of the flexible polyvinylchloride sheet in parallel lines.

In accordance with another aspect of the invention, the adhesive contacts the part of the flexible polyvinylchloride sheet in closed cell grids.

In accordance with another aspect of the invention, the adhesive contacts the part of the flexible polyvinylchloride sheet in open cell grids.

The bond between the flexible polyvinylchloride sheet and the non-woven liner of meta-aramid fiber is formed by heating the adhesive which melts the adhesive.

In accordance with a further aspect of the invention, the plasticizers are phthalate compositions. Further, the plasticizers can be phthalate free plasticizers derived from partial tranesterification, acetylation and epoxidation of vegetable oils with ethanol or glycerin.

In accordance with another aspect of the invention, the spaces between adhesive lines contacting the polyvinylchloride sheet are in the range of 0.25 to 1.2 mm. Alternatively, the spaces between adhesive lines contacting the polyvinylchloride sheet can be limited to the range of 0.5 to 1.0 mm. in accordance with further aspects of the present invention. Additionally, the spaces between adhesive lines contacting the polyvinylchloride sheet can be further limited to the range of 0.6 to 0.8 mm.

In accordance with another aspect of the invention, when incident heat flux from arc flash or flash fire is applied to the garment, the spaces between the adhesive contacting the polyvinylchloride sheet extract heat by conduction through the adhesive and the polyvinylchloride sheet cools locally where the adhesive contacts the polyvinylchloride sheet and the non-woven meta-aramid liner. In these cases, the polyvinylchloride sheet in spaces between the adhesive remains cool and prevents sagging, charring or ignition of polyvinylchloride sheet.

In accordance with another aspect of the invention, the adhesive is polyvinylchloride. The polyvinylchloride adhesive can have a molecular weight greater than 18,000. Alternatively, the adhesive can be polyvinylidenechloride or it can be a copolymer of polyvinylchloride and vinyl acetate or it can be a copolymer of polyvinylchloride and acrylonitrile.

In accordance with another aspect of the invention, at least one of the plurality of sections of the garment has no other layers than the polyvinylchloride sheet and the non-woven liner bonded together with the adhesive.

In accordance with another aspect of the invention, the non-woven liner of meta-aramid fiber has a plurality of open spaces, wherein the spacing between each of the open spaces along circumferential lines of 4, 5 and 6 mm is greater than 3 mm.

In accordance with another aspect of the invention, the garment meets the specifications of both ASTM F2733 and of ASTM F1891.

Another aspect of the invention is the fabric described herein, including the layer of polyvinylchloride sheet, the adhesive, and the non-woven liner. One aspect of the present invention is that the fabric only includes these three layers (including the adhesive as a layer). Thus, in this aspect of the invention, no other layers are included in the fabric, and at least one section of a garment is constructed with the three-layer fabric. A garment so constructed still meets the specifications of both ASTM F2733 and of ASTM F1891.

Methods of constructing the fabric and the garments are also described herein and considered to be part of the invention disclosed herein.

DESCRIPTION OF THE DRAWINGS

FIG. 4 is a table of effective thermal conductivity by conduction through a meta-aramid nonwoven (reproduced from a thesis submitted by Rahul Vallabh entitled "Thermal Barrier Properties of Flame Resistant Nonwovens" submitted to North Carolina State University in 2005 page 56);

FIG. 6 shows a schematic top view of a polyvinylchloride sheet with a layer of adhesive partially covering the sheet before the application of a third layer in three configurations of adhesive lines;

FIG. 7 is a table of data that shows the performance characteristics of Samples 1 and 2 indicating poor performance of prior art Sample 2 during flash fire test;

DETAILED DESCRIPTION OF THE INVENTION

Figure 1:
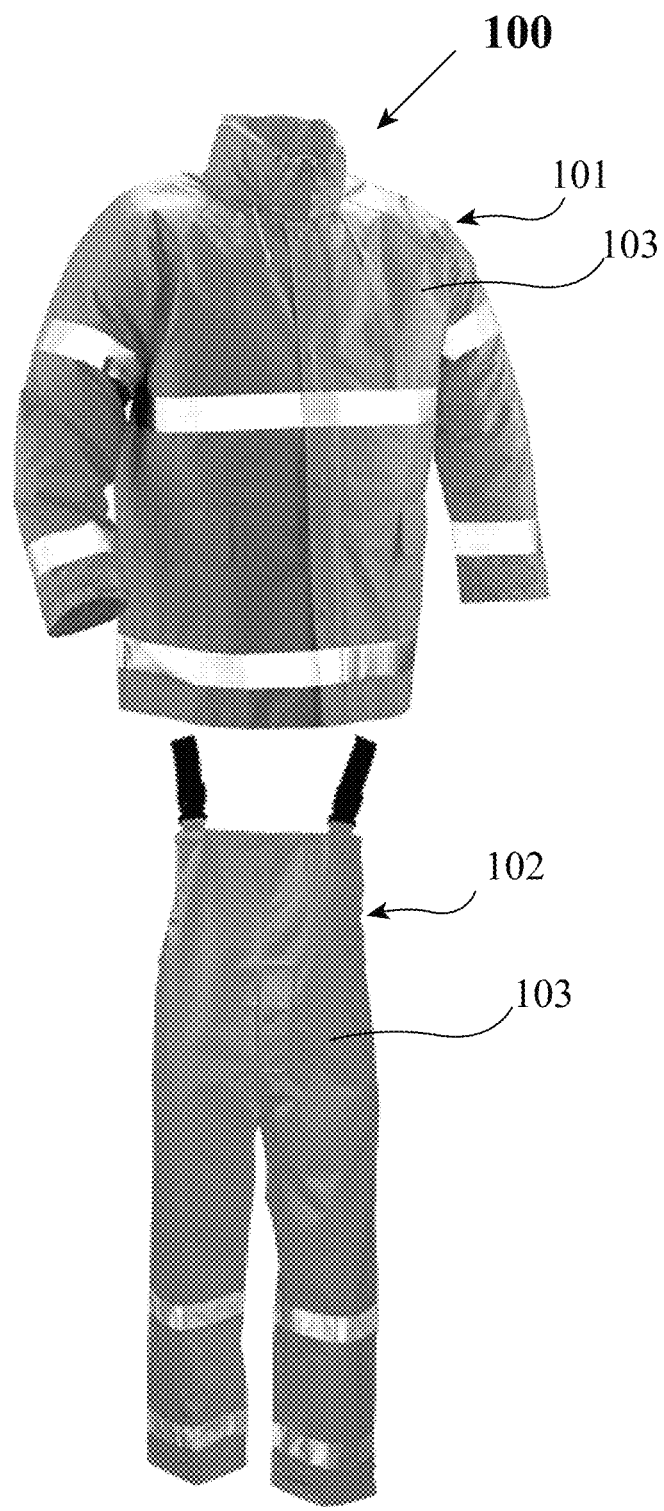
FIG. 1 shows garments constructed in accordance with one aspect of the present invention.

The present invention provides a method and a structure that produces a flexible arc flash and flash fire resistant fabric suited for forming garments meeting: ASTM D751: "Standard Test Methods for Coated Fabric"; ASTM D6413/D6413M: "Standard Test Method for Flame Resistance of Textiles (Vertical Test)"; ASTM F1891: "Standard Specification for Arc and Flame Resistant Rainwear"; ASTM F1930-00: "Standard Test Method for Evaluation of Flame Resistant Clothing for Protection Against Flash Fire Simulations Using an Instrumented Manikin"; and ASTM F2733-09: "Standard Specification for Flame Resistant Rainwear for Protection Against Flame Hazards". These tests are extremely demanding and it difficult to pass all the requirements using a single layer of polyvinylchloride sheet adhesively bonded to a non-woven liner of meta-aramid (Nomex) fibers. Our experimental work has produced a combination of elements that produce this outcome as detailed below.

Polyvinylchloride (PVC) sheets are commercially available from a number of commercial suppliers at different thickness levels. Flexible polyvinylchloride sheets usually contain plasticizers selected from DEHP (Di-2ethylhexylphthalate), Adipates, BTHC (Butyryltrihexylcitrate), Cyclohexane-1,2-dicarboxylic acid, DINCH (diisononylester), Di(2-ethylhexyl)terephthalate, polymerics and trimellitic acid, TOTM (2-ethylhexylester) or phthalate free plasticizers derived from partial tranesterification, acetylation and epoxidation of vegetable oils with ethanol or glycerin (U.S. Pat. No. 8,623,947 and U.S. Pat. No. 8,697,788). A polyvinylchloride sheet may be incorporated with high visibility organic dyes or inorganic pigments. Polyvinylchloride has inherently superior fire retarding properties due to its greater than 50 weight % chlorine content, even in the absence of fire retardants. For example, the ignition temperature of polyvinylchloride is as high as 455° C., and it is a material with low risk for fire incidents since it is not ignited easily. Furthermore, the heat released in burning is considerably lower with PVC, when compared with those for polyethylene and polypropylene. PVC therefore contributes much less to spreading fire to nearby materials even while burning. Polyvinylchloride has a typical melting point of 160° C.

Unplasticized polyvinyl chloride has the following thermal properties.

| Coefficient of Thermal Expansion ×10⁻⁶ K | Heat deflection temperature 0.45 MPa ° C. | Heat-deflection temperature 1.8 MPa ° C. | Lower working temperature ° C. | Specific heat J K⁻¹kg⁻¹ | Thermal Conductivity W m⁻¹K⁻¹ @25° C. | Upper working temperature ° C. |
|---|---|---|---|---|---|---|
| 75-100 | 70 | 67 | 30 | 1000-1500 | 0.12-0.25 | 50-75 |

While any non-woven meta-aramid fiber liner can be used in the fabric, a preferred non-woven meta-aramid fiber liner is readily available from Dupont, who sells such a fiber under the trade name NOMEX. This is a spunlaced fabric of meta-aramid fibers (Nomex). The non-woven fabric weighs about 1.1 oz per square yard. The machine direction grab strength is typically 26 pounds and in the cross direction grab strength is typically 16 pounds. Meta-aramid (Nomex) fibers in the fabric are non crystalline and do not conduct heat readily unlike para-aramid fibers (Kevlar) which is crystalline. Thus, meta-aramid fibers are more suited to provide insulation of heat from flame, arc flash or flash fire.

The subject invention uses a polyvinylchloride sheet adhesively bonded to a non-woven liner of meta-aramid fibers. The adhesive bond is patterned so that spaces between adhesive lines or grids are maintained in the range of 0.25 to 1.50 mm using a patterning method. One of the key features of the subject invention is controlled progressive withdrawal of heat from the polyvinylchloride outer sheet into the non-woven fabric substrate so that the polyvinylchloride sheet does not reach high enough temperature to sag, soften and melt. The free space of the polyvinylchloride sheet not contacting the adhesive is therefore restricted in the range of 0.25 to 1.50 mm. The melt dripping of the polyvinylchloride sheet is not permitted according to ASTM specifications wherein melting and dripping is considered as a failure. The smaller gaps between adhesive lines or grids have only small portion of the polyvinylchloride sheet exposed to the high heat input of arc flash or a flash fire.

The adhesive conducts the heat received to the non-woven meta-aramid fabric liner. The heat transfer through meta-aramid nonwovens is well known in the art ("Thermal Barrier Properties of Flame Resistant Nonwovens" thesis by Rahul Vallabh submitted to North Carolina State University in 2005). Since the non-woven meta-aramid (Nomex) fibers form enclosed spaces, convective heat flow is significantly reduced regardless of the packing density of the non-woven fabric as shown in FIG. 4. Z is the fraction of fibers oriented perpendicular to the direction of heat flow, which is the thickness direction of the meta-aramid (Nomex) non-woven fabric substrate. Conduction and radiation primarily contribute to the heat flow through the non-woven fabric substrate.

The choice of adhesive is very important. It must have a high enough melting or softening point so that it does not separate the polyvinylchloride sheet and the non-woven meta-aramid liner. It must also have adequate strength when the flame, arc flash or flash fire is applied to the polyvinylchloride fabric or garment during handling or exposure to flame and flash fire. This requires the melting or softening point of the adhesive polymer to be greater than 140° C. In addition, the adhesive should not ignite or catch fire when the flame, arc flash or flash fire is applied to the polyvinylchloride fabric or garment. The adhesive applied needs to be flexible, not rigid so that the garment produced is not stiff. In accordance with an aspect of the present invention, the adhesive is a plurality of discontinuous lines and forms discrete locations that are spaced in the range of 0.25 to 1.5 mm. In an alternate embodiment of the invention, the adhesive lines are spaced in the range of 0.5 mm to 1.0 mm. In another embodiment, the adhesive lines are spaced in the range of 0.6 to 0.8 mm.

A number of adhesives are suited for the bonding of polyvinylchloride sheet and a non-woven meta-aramid liner. Specifically, a polyvinylchloride adhesive is suited due to its high melting or softening point, the adhesive containing more than 50 percent of chlorine which is released at a temperature greater than the melting point of the adhesive and shields the adhesive area excluding any oxygen present preventing ignition of the adhesive. The molecular weight of the polyvinylchloride adhesive is very important since it directly controls the melting or softening point. A higher molecular weight of polyvinylchloride adhesive results in higher softening point and has a higher tensile modulus and strength properties resulting in a superior bond between the polyvinylchloride sheet and the non-woven meta-aramid liner even at elevated temperatures. The preferred adhesive has a molecular weight in the range of 18,000 to 40,000. A lower molecular weight of polyvinylchloride adhesive, typically in the molecular weight range of 4000 to 16,000 has low strength, melts or softens at a lower temperature and is unsuited for bonding the polyvinylchloride sheet and the non-woven meta-aramid liner and is unlikely to meet the ASTM standards for a flame, arc flash or a flash fire resistant fabric or garment. The higher molecular weight polyvinylchloride adhesive is insoluble in acetone as compared to the lower molecular weight polyvinylchloride adhesive which is dissolved by acetone solvent as detailed in U.S. Pat. Nos. 2,427,513; 2,517,356; and 2,646,414.

Another adhesive suited for bonding polyvinylchloride sheet and non-woven meta-aramid liner is polyvinylidenechloride. This adhesive has a higher level of chlorine since the monomer molecule has two chlorine atoms. The melting or softening temperature is about 200° C., as compared to polyvinylchloride adhesive which is about 160° C. This adhesive also suppresses ignition of the adhesive in the presence of oxygen due to its higher level of chlorine released.

Another adhesive suited for bonding polyvinylchloride sheet and non-woven meta-aramid liner is polyvinylchloride copolymers with vinyl acetate, commonly used electrical insulation and copolymer of vinyl chloride with acrylonitrile.

The fabric, more fully described below, in one embodiment, is formed using one or more polyvinylchloride sheets, an adhesive and a non-woven liner of meta-aramid fibers. In another embodiment of the fabric of the present invention, the fabric only uses a single polyvinylchloride sheet in combination with the adhesive and the non-woven liner of meta-aramid fibers. Alternatively more than one non-woven liner may be interlocked together to form a heat resisting liner bonded to the polyvinylchloride sheet using an adhesive, Thus, one embodiment of the present invention is a three-layer fabric useful in clothing that meets the stringent specifications set forth above.

FIG. 1 illustrates at 100 garments made according to subject invention. An arc flash and flash fire resistant coat 101 comprises the fabric of the invention 103. Arc flash and flash fire resistant pants 102 comprises the fabric of the invention shown 103. In accordance with an aspect of the invention, the garments 101 and 102 are made with the fabrics describe herein. Other garments, including but not limited to, overalls and vests, can be made with the fabric described herein.

Figure 2:
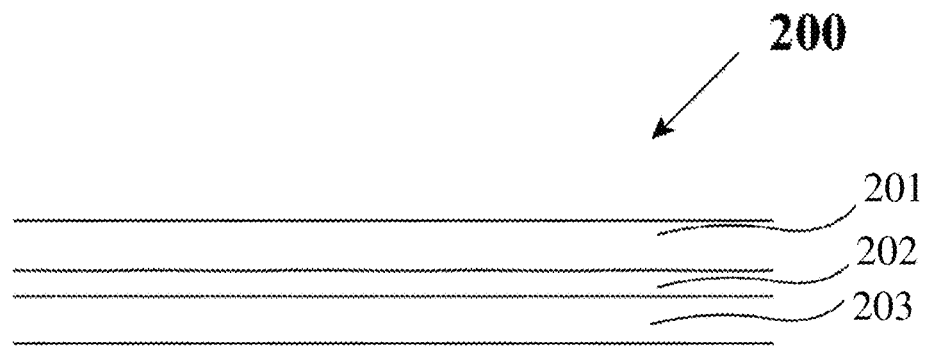
FIG. 2 shows a schematic side view of a fabric of the garment.

FIG. 2 illustrates a schematic side view of a three-layer fabric 200 in accordance with an aspect of the present invention. The layers are: a polyvinylchloride sheet 201, a layer of adhesive 202, and a non-woven liner of meta-aramid fibers 203.

Figure 3:
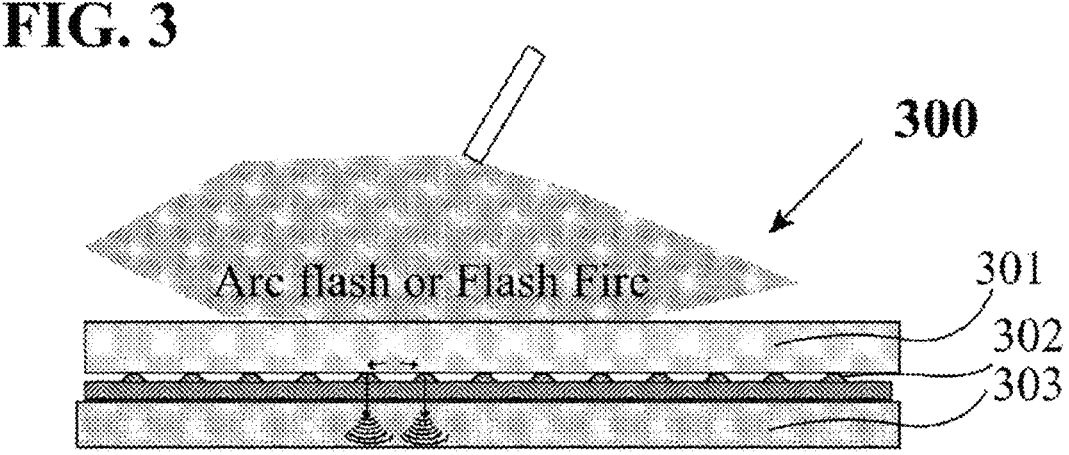
FIG. 3 shows a schematic depiction of heat flow path through the flexible polyvinylchloride sheet adhesively bonded to the meta-aramid non-woven liner.

FIG. 3 illustrates a schematic depiction of the process of heat dissipation from the fabric used for the garments of the present invention when flame, arc flash, or flash fire is applied to the fabric. The temperature of the polyvinylchloride sheet increases as heat is applied. The heat is conducted through the polyvinylchloride sheet 301 and is extracted through the adhesive bond 302, which locally at spaced locations, as shown by the arrows. The heat is delivered to the non-woven meta-aramid liner 303, which has some conduction capacity and a good amount of radiation heat transfer capacity to dissipate the heat received. The radiation is illustrated as a series of progressively increasing diameter circles.

FIG. 4 is a table 400 of effective thermal conductivity by conduction through a meta-aramid nonwoven when the fibers are oriented at different orientations, depicted by parameter Z and the density of the meta-aramid nonwoven.

Figure 5:
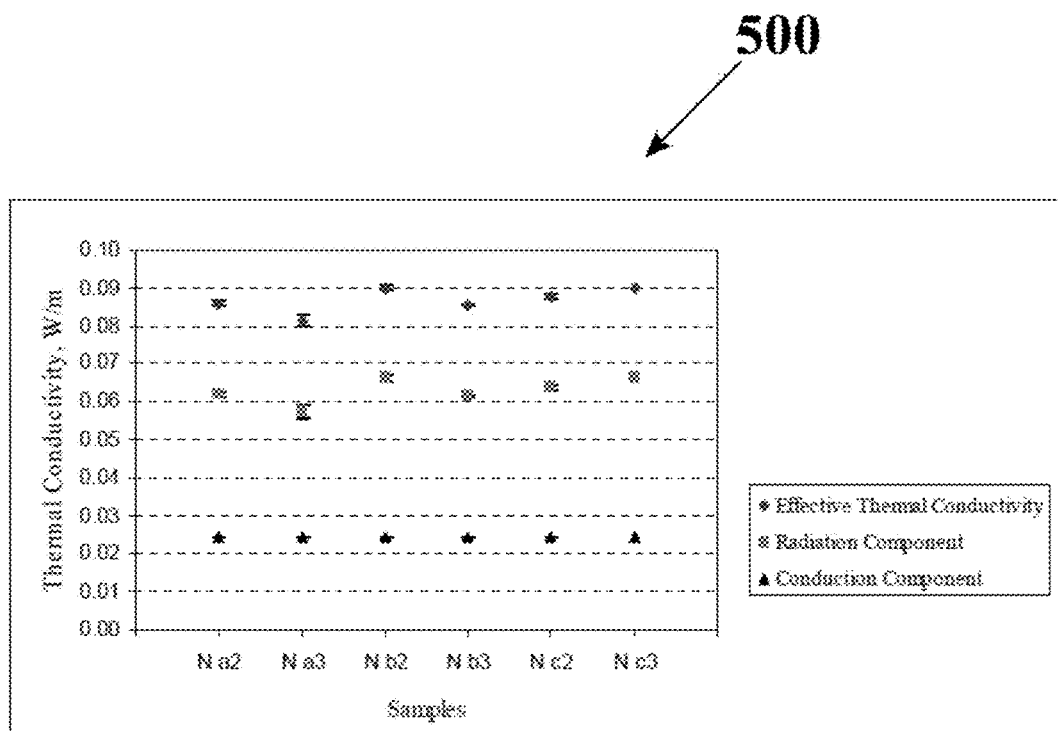
FIG. 5 is a graph of heat transport contribution through a meta-aramid nonwoven by conduction and radiation (reproduced from the thesis submitted by Rahul Vallabh entitled "Thermal Barrier Properties of Flame Resistant Nonwovens" submitted to North Carolina State University in 2005 page 57)

FIG. 5 is a graph 500 of heat propagation through a meta-aramid nonwoven by conduction and radiation at different liner density levels. Heat transfer through convection is absent. Predominant modes of heat transfer through the liner are by conduction and radiative heat transfer mechanisms. Thermal transport through the non-woven meta-aramid (Nomex) fabric substrate is nearly independent of density.

FIG. 6 illustrates, in three views FIG. 6a, FIG. 6b and FIG. 6c, three embodiments of the application of the layer of adhesive 202 to the polyvinylchloride sheet 201 before the non-woven liner of meta-aramid fibers 203 (FIG. 2) is applied to complete the fabric. The adhesive 202, in this case, is applied to the polyvinylchloride sheet 201 as a series of lines in the form of a closed or open grid. The grids of FIG. 6a and FIG. 6b are closed in a closed cell arrangement, while the grid of FIG. 6c is open in an open cell arrangement. The key requirement is that the free space between the adhesive lines limits the distance of the free polyvinylchloride sheet in the range of 0.25 to 1.50 mm, limiting its sagging of the polyvinylchloride sheet when arc flash or flash fire is applied to the garment. The adhesive 202 can also be applied as parallel lines that run in any direction along the polyvinylchloride sheet 201. The adhesive 202 can also be applied to the polyvinylchloride sheet 201 in any other manner. The arrangement of the adhesive lines may be wavy lines or lines whose length is significantly longer than the width of the adhesive lines. The adhesive may be chosen from polyvinylchloride having a molecular weight exceeding 18,000 units having a higher softening point in excess of 140° C., polyvinylidenechloride or polyvinylchloride vinyl acetate copolymer.

Two samples, Sample 1 and Sample 2, of a polyvinylchloride sheet adhesively bonded to a non-woven meta-aramid liner were prepared. Sample 1 had a high molecular weight polyvinyl chloride adhesive and was laid as a powder or a stiff gel in the form of lines. Sample 1 survived dissolution by acetone solvent indicating the high molecular weight of the polyvinylchloride adhesive. Sample 2, which is a comparative prior art sample, has been used to make coats for at least several years now, is believed to have had a low molecular weight polyvinylchloride adhesive, typically in the range of 4,000 to 16,000 units and was laid as a spray of solvent dissolved adhesive. Sample 2 had poor bonding between the polyvinylchloride sheet and the non-woven meta-aramid liner; and the polyvinylchloride sheet and non-woven meta-aramid liner and the bond could be completely separated by dissolution of the polyvinylchloride adhesive by using acetone solvent. This dissolution of the bond clearly verifies that the polyvinylchloride adhesive used for the bond creation of Sample 2 was a low molecular weight polyvinyl chloride polymer.

Sample 1 and Sample 2 were subjected to ASTM specification tests and the results are reported in the table of FIG. 7. Prior art Sample 2 did not pass the flash fire test, even though the total weight of sample 2 was greater at a reduced thickness relative to sample 1. Since the polyvinylchloride sheet and the non-woven meta-aramid liner used were the same for both samples 1 and 2, the only difference was the nature of the adhesive used and structural layout used. In fact, Sample 2 caught fire during arc flash test and flash fire test.

Figure 8:
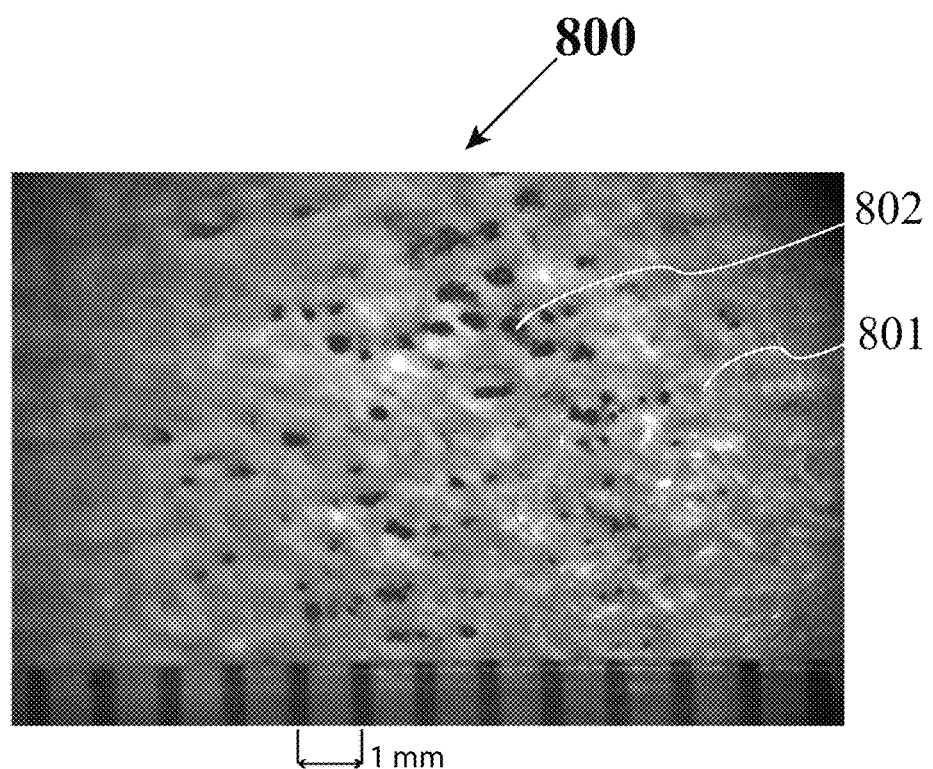
FIG. 8 is a photomicrograph of sample 1, a polyvinylchloride sheet adhesively bonded to a non-woven meta-aramid liner, showing the appearance of the liner.

FIG. 8 shows at 800 a photomicrograph of Sample 1, which is a polyvinylchloride sheet adhesively bonded to a non-woven meta-aramid liner indicating the appearance of the liner. The millimeter marker is included in the bottom of the photograph. The non-woven meta-aramid liner is white fuzzy material indicated at 801. The gaps in the liner allow the underlying polyvinyl chloride to show through and is clearly seen at 802.

The distance between the locations where the polyvinylchloride sheet shows through the non-woven meta-aramid liner is analyzed by quantitative microcopy. The techniques of analyzing microscopic features are detailed in the book "Quantiative Microscopy" by DeHoff and Rhines, published by McGraw Hill Book Company, 1968. Three concentric circles having 6 mm, 5 mm and 4 mm diameter were drawn in the micrograph of FIG. 8 and the number of locations where polyvinylchloride sheet was visible through the non-woven meta-aramid liner was counted and reported. The three concentric circles were moved to a different location in the micrograph of FIG. 8 and the counting procedure was repeated. The results are shown below. The table below shows the circle diameter, circumference of the circle in mm, the number of crossings seen for each of the three measurements. The average number of visible polyvinylchloride locations per mm of line length was calculated to be 0.26, indicating that the visible portions are spaced nearly 4 mm apart in the sample 1. This spacing distance is important and indicates the quality of the non-woven meta-aramid insulating liner and, in one embodiment of the present invention, the spacing of the visible portions along any circumferential line is greater than 3 mm along any length of the liner. A smaller distance indicates that the liner has many holes and does not provide insulation properties.

Sample 1

| Circle Dia. Mm | Length mm | Crossings # | #/length | Crossings # | #/length | Crossings # | #/length | |
|---|---|---|---|---|---|---|---|---|
| 6 | 18.85 | 6 | 0.32 | 6 | 0.32 | 4 | 0.21 | |
| 5 | 15.71 | 4 | 0.25 | 3 | 0.19 | 6 | 0.38 | |
| 4 | 12.57 | 2 | 0.16 | 2 | 0.16 | 4 | 0.32 | |
| AVERAGE | | | 0.24 | | 0.22 | | 0.30 | 0.26 |

In accordance with other aspects of the invention, the average number of crossings of visible sections of the polyvinylchloride sheet, per length of concentric circle, when concentric circles of 6 mm, 5 mm and 4 mm are applied, as explained above, is no more than 0.26.

Figure 9A:
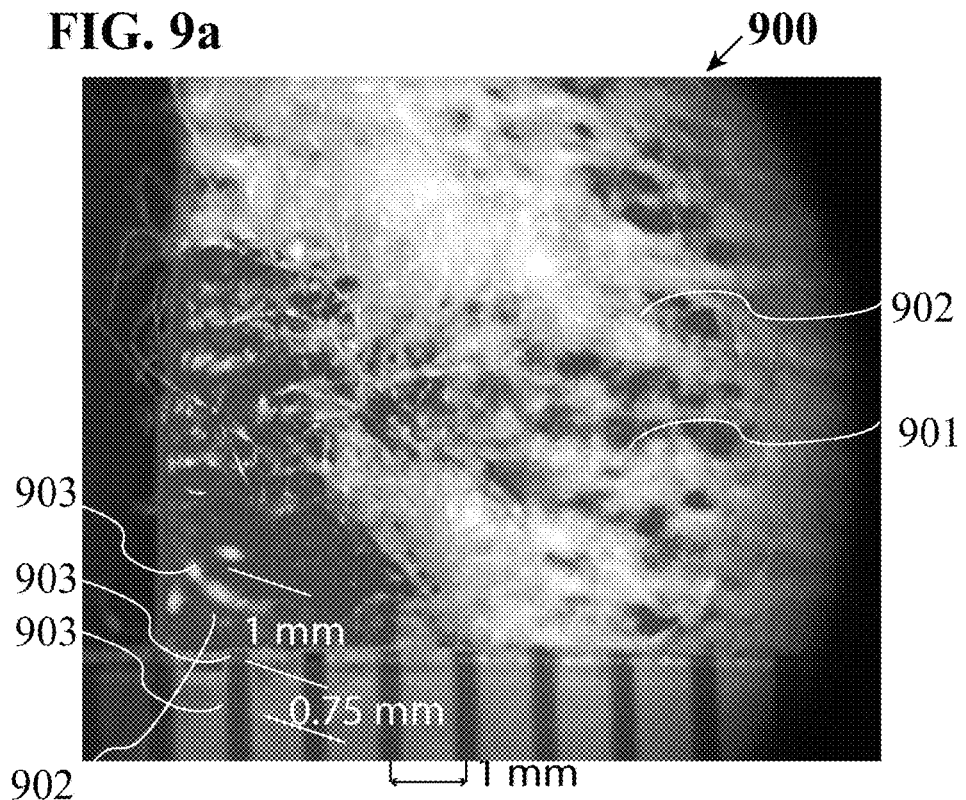
FIGS. 9a and 9b are a photomicrographs of sample 1, a polyvinylchloride sheet adhesively bonded to a non-woven meta-aramid liner with the liner removed on one side showing the appearance adhesive lines.
Figure 9B:
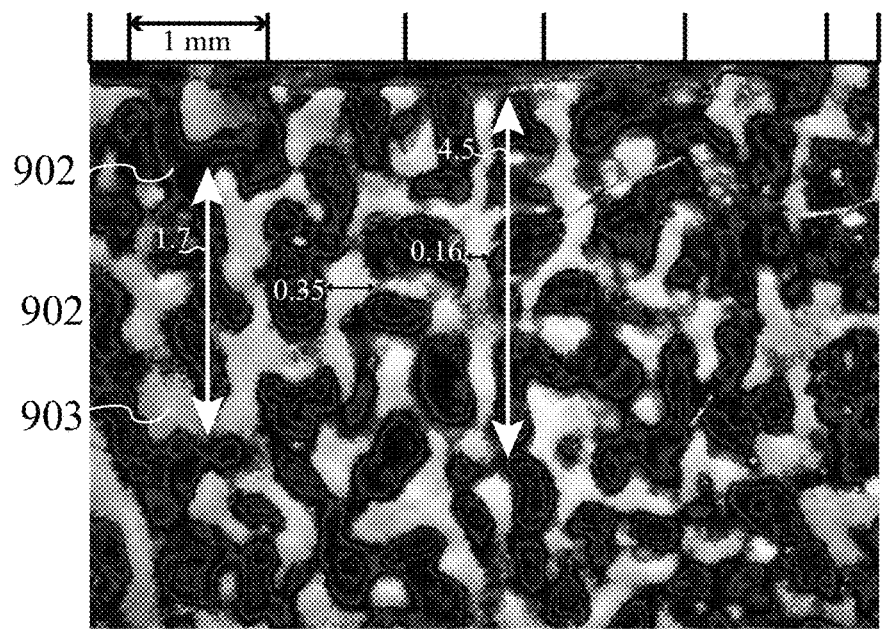

A razor blade was used to carefully displace the liner at one end without scraping the adhesive bond. FIGS. 9a and 9b each show at 900 a photomicrograph of Sample 1, which is a polyvinylchloride sheet adhesively bonded to a non-woven meta-aramid liner indicating the appearance of the liner and the adhesive bond. The millimeter marker is included in the bottom of the photograph. The displaced fuzz of the liner is clearly seen. Here again, 901 is the white fuzzy liner and 902 is the polyvinylchloride sheet visible through the non-woven meta-aramid liner. The lines of adhesive 903, though not continuous are spaced in the range of 0.25 mm to 1.50 mm as shown. The lines of adhesive nearly parallel to the horizontal direction with a slight angle pointing downwards. The overall pattern of the non-woven meta-aramid liner also follows this slight angle pointing downwards indicating that the liner is held in place by the locations of the adhesive and its pattern replicates the character of the adhesive laid on the polyvinylchloride sheet.

When the liner is displaced by gentle action of the razor blade, it reveals more of the underlying polyvinylchloride sheet visible at 902. The adhesive lines are clearly seen at 903 and few of the representative adhesive lines are indicated. The spacing between the adhesive lines as indicated is 0.75 mm and 1 mm, which is in the range of 0.25 mm to 1.50 mm.

A higher magnification of the razor blade scraped Sample 1 at a different location is shown in FIG. 9b. Reference 902 shows the polyvinylchloride sheet and reference 903 is the adhesive present on the polyvinylchloride sheet. The adhesive lines are nominally in the vertical direction with lengths ranging from 1.4 mm to 10 mm. The adhesive lines in FIG. 9b have lengths of 4.5 mm and 1.7 mm which falls within the stated range. The adhesive lines have a thickness in the range of 0.1 mm to 1 mm. Two adhesive lines are measured to have dimensions of 0.35 mm and 0.16 mm, which are within the stated range.

Figure 10:
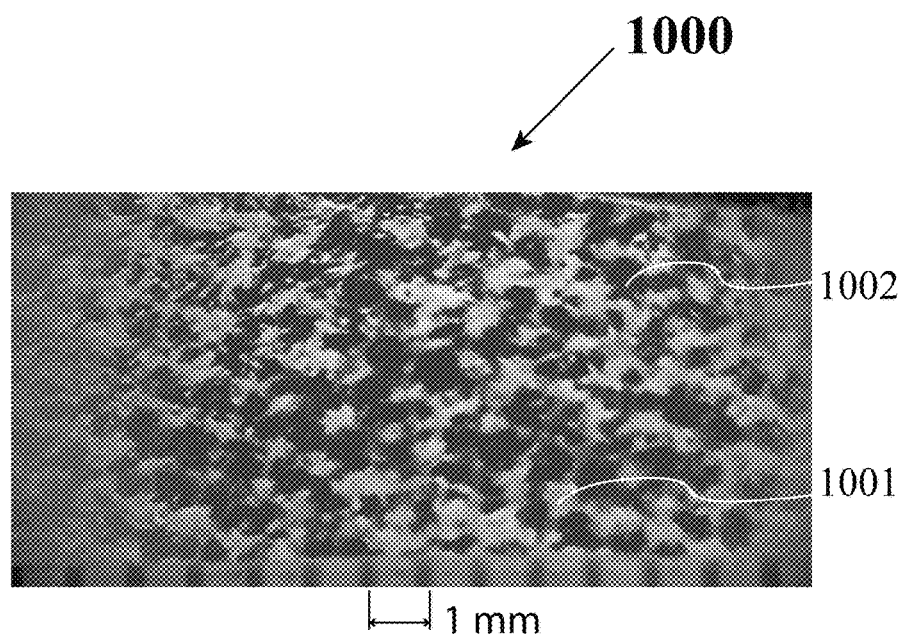
FIG. 10 (prior art) is a photomicrograph of sample 2, a polyvinylchloride sheet adhesively bonded to a non-woven meta-aramid liner showing the appearance of the liner.

FIG. 10 shows at 1000 a photomicrograph of Sample 2 (prior art), which is a polyvinylchloride sheet adhesively bonded to a non-woven meta-aramid liner indicating the appearance of the liner. The millimeter marker is included in the bottom of the photograph. The non-woven meta-aramid liner is white fuzzy material is indicated at 1001. The adhesive below the non-woven meta-aramid (Nomex) liner is not visible. The gaps in the liner allow the underlying polyvinyl chloride to show through and is clearly seen at 1002. Unlike Sample 1 of FIG. 8, the non-woven meta-aramid liner is sparse having the appearance of attachment of plurality tufts.

The distance between the locations where the polyvinylchloride sheet shows through the non-woven meta-aramid liner was again analyzed by quantitative microcopy. Three concentric circles having 6 mm, 5 mm and 4 mm diameter were drawn in the micrograph of FIG. 10 and the number of locations where polyvinylchloride sheet was visible through the non-woven meta-aramid liner was counted and reported. The three concentric circles were moved to a different location in the micrograph of FIG. 10 and the counting procedure was repeated. The results are shown below. The table below shows the circle diameter, circumference of the circle in mm, the number of crossings seen for each of the three measurements. The average number of visible polyvinylchloride locations per mm of line length was calculated to be 1.01 mm indicating that the visible portions are spaced nearly 1 mm apart in the sample 1.

Sample 2

| Circle Dia. Mm | Length mm | Crossings # | #/length | Crossings # | #/length | Crossings # | #/length | |
|---|---|---|---|---|---|---|---|---|
| 6 | 18.85 | 17 | 0.90 | 19 | 0.99 | 16 | 1.18 | |
| 5 | 15.71 | 15 | 0.95 | 16 | 0.98 | 13 | 1.21 | |
| 4 | 12.57 | 11 | 0.88 | 14 | 0.90 | 11 | 1.14 | |
| AVERAGE | | | 0.91 | | 0.96 | | 1.18 | 1.01 |

In accordance with other aspects of the invention, the average number of crossings of visible sections of the polyvinylchloride sheet, per length of concentric circle, when concentric circles of 6 mm, 5 mm and 4 mm are applied, as explained above, is no more than 1.

Figure 11:
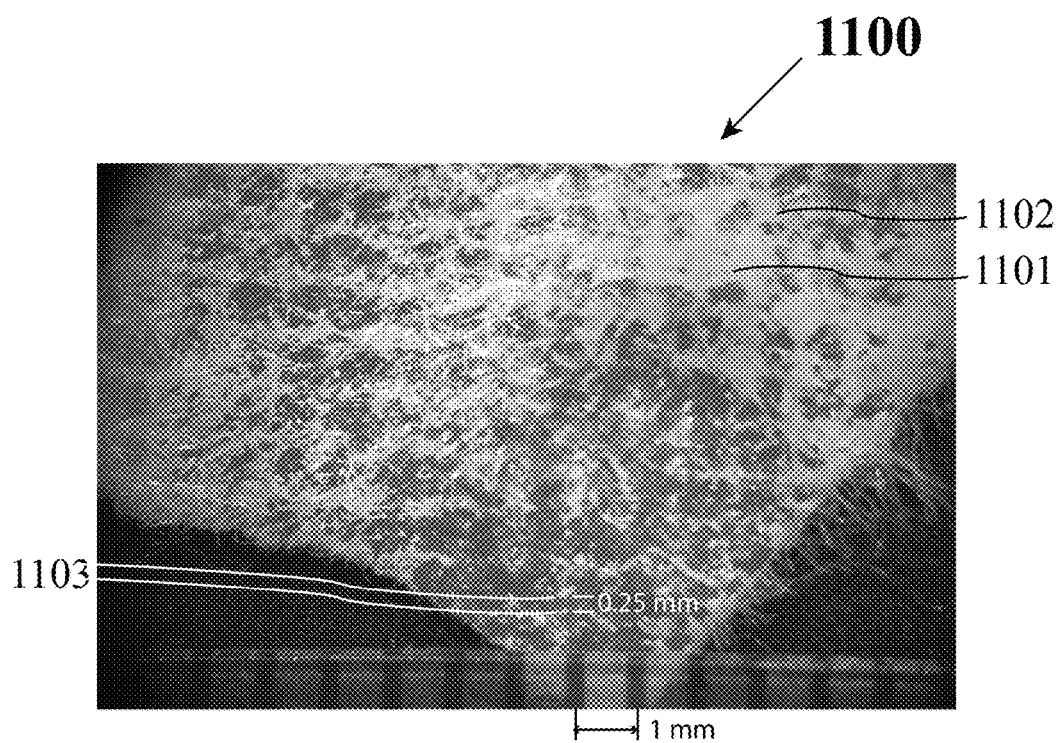
FIG. 11 (prior art) is a photomicrograph of sample 2 a polyvinylchloride sheet adhesively bonded to a non-woven meta-aramid liner with the liner removed on one side showing the appearance of the adhesive.

A razor blade was used to carefully displace the liner at one end without scraping the adhesive bond. FIG. 11 (prior art) shows at 1100 a photomicrograph of Sample 2, which is a polyvinylchloride sheet adhesively, bonded to a non-woven meta-aramid liner indicating the appearance of the liner. The millimeter marker is included in the bottom of the photograph. The displaced fuzz of the liner is clearly seen. Here again, 1101 is the white fuzzy liner and 1102 is the polyvinylchloride sheet visible through the non-woven meta-aramid liner. When the liner is displaced by gentle action of the razor blade, it reveals more of the underlying polyvinylchloride sheet. The adhesive spots are clearly seen at 1103 and few of the representative adhesive spots are indicated. The spacing between the adhesive spots as indicated is only 0.25 mm and heat transport through these spot contacts between the polyvinylchloride sheet and the non-woven meta-aramid liner is expected to be very small. Thus this fabric is not expected to survive flash fire, which imparts a significantly greater heat input as compared to arc flash test procedure.

Figure 12:
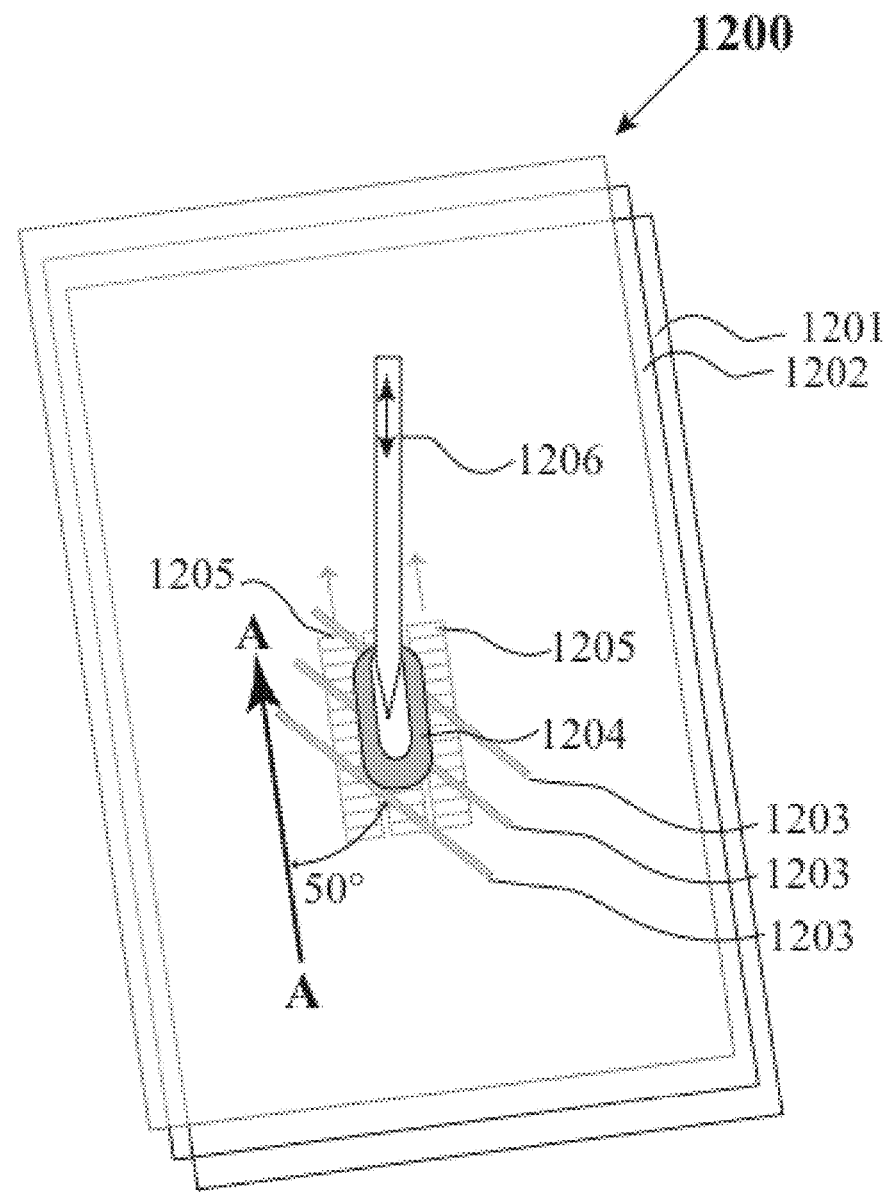
FIG. 12 is a representation of stitching of a coat wherein the stitching direction is of set at an angle with respect to the adhesive lines.

FIG. 12 illustrates a portion of a coat 1200 with a three layer fabric comprising the polyvinylchloride sheet 1202, the non-woven meta-aramid liner 1201 and the adhesive lines 1203 being stitched in the direction AA. The stitching direction is shown to be inclined to adhesive lines at 50 degrees as shown. The angle of inclination may be selected in the range of 5° to 85°. During stitching, the three-layer fabric is held in place by the retainer 1204, which applies a vertical retaining load on the fabric, and the fabric pushing mechanism directly below the three layer fabric 1205 pushes the three layer fabric along the stitching direction. The pushing mechanism advances the fabric between subsequent insertions of the needle 1206. If the angle of inclination were to be set at 90 degrees, undue amount of loading is applied to a single line of the adhesive, which may tear causing local delamination of the polyvinylchloride sheet from the non-woven meta-aramid liner. However, if the stitching direction is set at an angle in the range of 5 to 85 degrees with respect to the adhesive line, more than a single adhesive line bears the fabric advancing mechanism loading preventing local delamination of the fabric.

Figure 13:
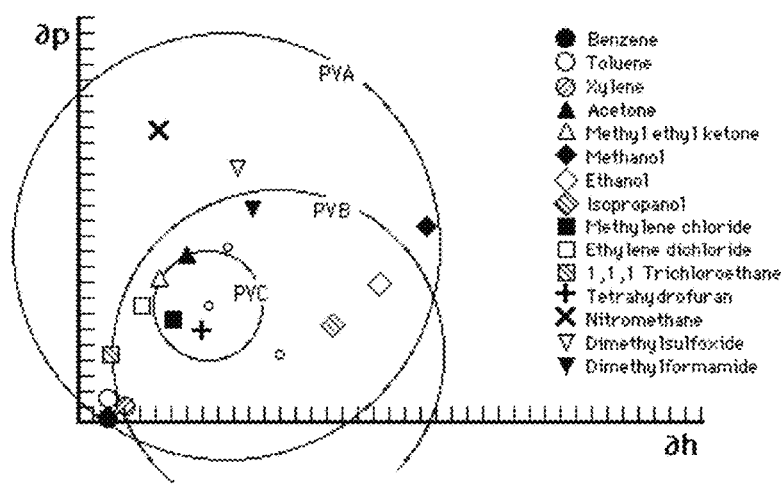
FIG. 13 is a reproduction of FIG. 7 from web page at http://engineering.ucsb.edu/~saurabh/Presentations/Solvents.pdf showing solubility of polyvinylchloride in various solvents.

FIG. 13 shows the solubility of PVC in various solvents. This plot of Hansen properties that is available at the web page http://engineering.ucsb.edu/~saurabh/Presentations/Solvents.pdf. As shown in FIG. 13, polyvinylchloride is soluble in methylene chloride and tetrahydrofuron since they fall within the circle indicated. Since acetone is on the boundary of the circle in the Hansen graph of solubility, the solubility of PVC in acetone is expected to be minimal.

As previously described, the fabric of the subject invention uses a polyvinylchloride sheet adhesively bonded to a non-woven liner of meta-aramid fibers. The adhesive bond is patterned so that spaces between adhesive lines or grids are maintained in the range of 0.25 to 1.50 mm using a patterning method. Other ranges may be used. For example, a range of 0.25 to 1.20 mm. can be maintained, or a range of 0.5 to 1.00 mm can be maintained or a range of 0.60 to 0.80 mm. can also be maintained. This spacing is critical to provide the arc flash or flash fire resistant and heat resistant qualities of the present invention.

The key feature of the subject invention is controlled progressive withdrawal of heat from the polyvinylchloride outer sheet into the non-woven fabric substrate so that the polyvinylchloride sheet does not reach high enough temperature to sag, soften and melt, which is achieved by the structure and materials described herein.

According to applicable tests for flame, arc flash and flash fire flame resistant clothing, including the aforementioned ASTM D751, ASTM D6413/D6413M, ASTM F1891, ASTM F2733, and ASTM F 1930-00, melt dripping of the polyvinylchloride sheet is not permitted as melting and dripping are considered as failures.

The gaps between adhesive lines or grids in the present invention permit only a small portion of the polyvinylchloride sheet to be exposed to the high heat input of an arc flash or a flash fire. During a scenario where heat is applied to the fabric, the adhesive conducts the heat received to the non-woven meta-aramid fabric liner (see FIGS. 4 and 5, and previous discussions).

Therefore a garment made with the fabric of the present invention that is subjected to flame, arc flash or arc flash has to withstand several elements.

First, heat from the arc flash or flash fire has to be removed from the polyvinylchloride sheet promptly to prevent sagging, melting and thermal decomposition of the sheet accomplished by thermal conduction through the bonding adhesive due to its intimate contact;

Second, the adhesive cannot bond the entire surface of the polyvinylchloride sheet since this reduces or eliminates flexibility of the garment fabric created.

Third, the heat transfer is adequate to sustain integrity of the sample within the limits stipulated in the ASTM specifications for the time period required passing these ASTM test requirements.

Meeting the requirements 1 through 3 is made possible by adjusting the spacing between lines or grids of adhesive applied to a polyvinylchloride sheet prior to its bonding with the non-woven liner substrate made from meta-aramid (Nomex) fibers. This may be done by spraying a powdered adhesive and combing in in one or two directions generating parallel lines or a closed cell or open celled grid. The bonding process is conventional and requires heating to a temperature that softens the adhesive and passing the bonding sample through pressure applying rollers, while other processes may be used equally well. Due to the precise positioning of the adhesive, heat collected by the polyvinylchloride outer layer of the fabric is conducted away through the adhesive and passed on to the non-woven meta-aramid liner.

Briefly stated, the present invention manages the heat flow from an arc flash or flash fire resistant fabric with which the protective garment is made. This is accomplished by having controlled closely spaced contact regions between the bonding adhesive and the polyvinylchloride sheet, thereby the extent of regions of polyvinylchloride sheet not contacting the adhesive and receiving heat flux from the flame, arc flash or flash fire are controlled so that the polyvinyl chloride polymer does not sag, melt or catch fire or degrade. The adhesive serve to take away the heat flux received and transmits to the non-woven meta-aramid (Nomex) liner. The flash fire test imparts a higher level of heat flux load as compared to the flame exposure test and is more difficult to pass the ASTM specifications.

In its preferred embodiment, the light weight flexible flame, arc flash and flash fire resistant polyvinylchloride garments of the present invention comprises:

1) a flexible polyvinylchloride sheet comprising plasticizers chosen from phthalates or modified organic phthalate free compositions;

2) said flexible polyvinylchloride provided with adhesive layer in the form of spaced lines or grids controlling free space distance between spaces in the range of 0.25 to 1.50 mm;

3) said flexible polyvinylchloride sheet with adhesive lines or grids contacting a non-woven liner of meta-aramid (Nomex) fiber liner and heated to soften or evaporate solvent of the adhesive and create a bond between the flexible polyvinylchloride sheet and the liner;

whereby the spaces between the adhesive lines in combination with the contact of adhesive coated regions transmit incident heat flux from a flame, arc flash or flash fire on the polyvinylchloride outer sheet preventing sagging, melting or ignition of regions between adhesive coated regions in the polyvinyl sheet thereby passing ASTM specifications.

In its preferred embodiment, the method for the manufacture of flexible, arc flash and flash fire resistant polyvinylchloride fabrics and garments of the present invention comprises:

1) selecting a flexible polyvinylchloride sheet comprising plasticizers chosen from phthalates or modified organic phthalate free compositions;

2) said flexible polyvinylchloride is provided with well defined spaces of adhesive layer in the form of parallel lines or grids controlling free space distance between spaces occupied by the adhesive by a spray and comb process or by screen printing of powder or liquid adhesive;

3) heating said flexible polyvinylchloride sheet with adhesive lines or grids contacting a non-woven liner of meta-aramid (Nomex) fiber liner to soften the adhesive or evaporate solvent used to create a bond between the flexible polyvinylchloride sheet and the liner;

whereby the spaces between the adhesive lines in combination with the contact of adhesive coated regions transmit incident heat flux on the polyvinylchloride outer sheet preventing sagging, melting or ignition of regions between adhesive coated regions.

This invention also relates to flexible arc flash and flash fire resistant garments made with the previously described fabric. The protective garments made from the fabric have to withstand severe heat flux condition such as exposure to arc flash as well as flash fire as detailed in the aforementioned ASTM test protocol, where the heat flux conditions are exposed to a fixed time period. The metrics of the test include temperature inside the garment and the status of the protective garment, for example the measured temperature in the interior of the garment, the degree of char generated, if the garment ignites or not and or melts and drips. Clearly melting of the outer protective layer of the garment, which is the polyvinylchloride sheet, results in loss of protective material and is not acceptable.

The subject invention prevents excessive exposure to heat flux through controlled removal of heat accumulated from the polyvinylchloride sheet through the conductive properties of adhesive provided at predetermined spacing so that the unattached portion of the polyvinylchloride sheet does not sag, catch fire or drip during arc flash or flash fire exposure.

Both the polyvinylchloride sheet and non-woven liner of meta-aramid are standard products commercially available. These components are bonded by an adhesive. The adhesive commonly used is polyvinylchloride adhesive, again due to its flame resistance properties. The molecular weight of polyvinylchloride adhesive used has a strong influence on its softening point and adhesion strength developed, and lower molecular weight adhesive has slightly lower softening point and generates lower adhesive strength. However, other adhesives can be used. By way of example only, polyvinylidenechloride, polyvinylchloride copolymers with vinyl acetate or copolymer of polyvinylchloride with acrylonitrile can also be used.

Another aspect of the present invention is the fabric itself which is described herein. The fabric includes the polyvinylchloride sheet, the non-woven aramid liner and the adhesive that binds the polyvinylchloride sheet and the non-woven aramid liner together in the manner previously described. In accordance with an aspect of the invention, the fabric only has three layers—the polyvinylchloride sheet, the non-woven aramid liner and the adhesive.

As previously described, another aspect is directed at using the fabric in garments. The garments include coats, overalls, pants, vests and the like. In accordance with an aspect of the invention, the entire garment is made with a fabric described herein. Alternatively one or more sections of the garment can be made with the fabric described herein.

Having thus described the invention in rather full detail, it will be understood that such detail need not be strictly adhered to, but that additional changes and modifications may suggest themselves to one skilled in the art, all falling within the scope of the invention as defined by the claims.

The invention claimed is:

1. An apparatus comprising:
   a garment having a plurality of sections made with a fabric;
   the fabric of the garment comprising:
      a flexible polyvinylchloride sheet comprising plasticizers;
      a non-woven liner of meta-aramid fiber;
      an adhesive covering a part of the flexible polyvinylchloride sheet that forms a bond only between a part of the flexible polyvinylchloride sheet and a part of the non-woven liner of meta-aramid fiber, the adhesive being discontinuous lines and forming discrete locations that are spaced in the range of 0.25 to 1.5 mm,
   wherein the flexible polyvinylchloride sheet forms an outside of the garment that is exposed during wear.

2. The apparatus of claim 1, wherein the adhesive contacts the part of the polyvinylchloride sheet in parallel lines.

3. The apparatus of claim 1, wherein the adhesive contacts the part of the flexible polyvinylchloride sheet in closed cell grids.

4. The apparatus of claim 1, wherein the adhesive contacts the part of the flexible polyvinylchloride sheet in open cell grids.

5. The apparatus of claim 1, wherein the bond between the flexible polyvinylchloride sheet and the non-woven liner of meta-aramid fiber is formed by heating the adhesive which melts the adhesive.

6. The apparatus of claim 1 wherein the plasticizers are phthalate compositions.

7. The apparatus of claim 1 wherein the plasticizers are phthalate free plasticizers derived from partial tranesterification, acetylation and epoxidation of vegetable oils with ethanol or glycerin.

8. The apparatus of claim 1 wherein spaces between adhesive lines contacting the polyvinylchloride sheet is in the range of 0.25 to 1.2 mm.

9. The apparatus of claim 1 wherein spaces between adhesive lines contacting the polyvinylchloride sheet is in the range of 0.5 to 1.0 mm.

10. The apparatus of claim 1 wherein spaces between adhesive lines contacting the polyvinylchloride sheet is in the range of 0.6 to 0.8 mm.

11. The apparatus of claim 1 wherein when incident heat flux from arc flash or flash fire is applied to the fabric, the spaces between the adhesive contacting the polyvinylchloride sheet extract heat by conduction through the adhesive and the polyvinylchloride sheet cools locally where the adhesive contacts the polyvinylchloride sheet and the non-woven meta-aramid liner.

12. The apparatus of claim 1 wherein when incident heat flux from arc flash or flash fire is applied to the fabric, the polyvinylchloride sheet in spaces between the adhesive remains cool and prevents sagging, charring or ignition of polyvinylchloride sheet.

13. The apparatus of claim 1 wherein the adhesive is polyvinylchloride.

14. The apparatus of claim 13 wherein the polyvinylchloride adhesive has a molecular weight greater than 18,000.

15. The apparatus of claim 1 wherein the adhesive is polyvinylidenechloride.

16. The apparatus of claim 1 wherein the adhesive is copolymer of polyvinylchloride and vinyl acetate.

17. The apparatus of claim 1 wherein the adhesive is copolymer of polyvinylchloride and acrylonitrile.

18. The apparatus of claim 1 wherein at least one of the plurality of sections of the garment has no other layers than the polyvinylchloride sheet and the non-woven liner bonded together with the adhesive.

19. The apparatus of claim 1, wherein the non-woven liner of meta-aramid fiber has a plurality of open spaces, wherein the spacing between each of the open spaces along circumferential lines of 4, 5 and 6 mm is greater than 3 mm.

20. The apparatus of claim 19, wherein the garment meets the specifications of ASTM F2733 and of ASTM F1891.

21. The apparatus of claim 1, wherein the garment is selected from the group consisting of coats, overalls, pants, and vests.

* * * * *